Feb. 18, 1958   L. H. TOBEY   2,823,501
MACHINE FOR FILLING AND CLOSING CARTONS
Filed June 21, 1956   8 Sheets-Sheet 1

INVENTOR.
LEON H. TOBEY
BY
*Edward H. Cumpston*
HIS ATTORNEY

Feb. 18, 1958 L. H. TOBEY 2,823,501
MACHINE FOR FILLING AND CLOSING CARTONS
Filed June 21, 1956 8 Sheets-Sheet 2
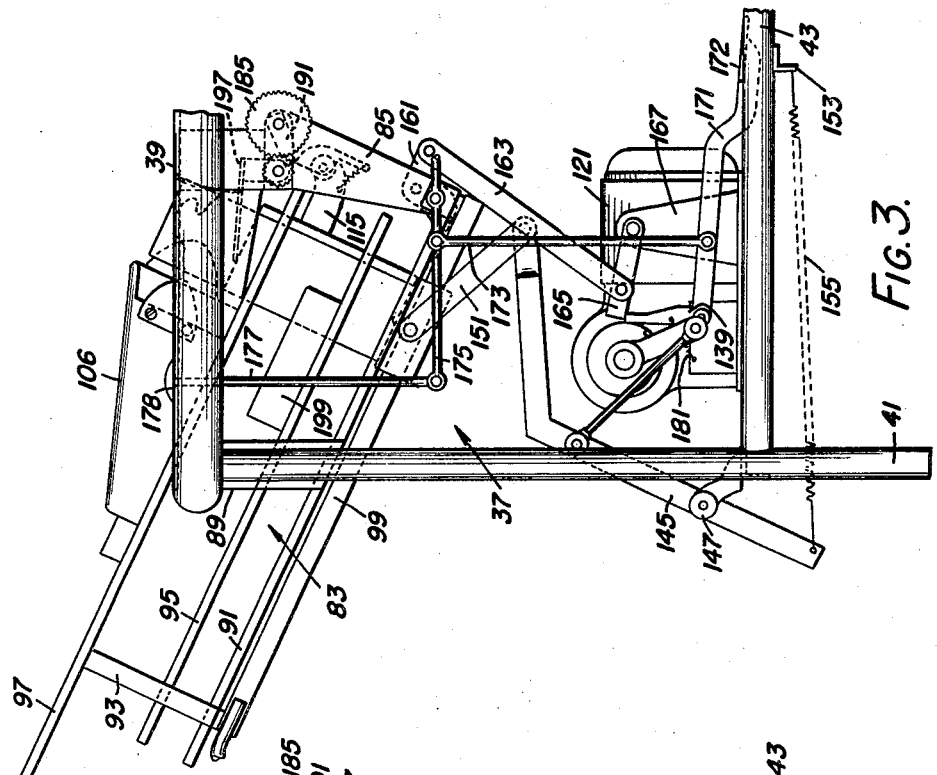
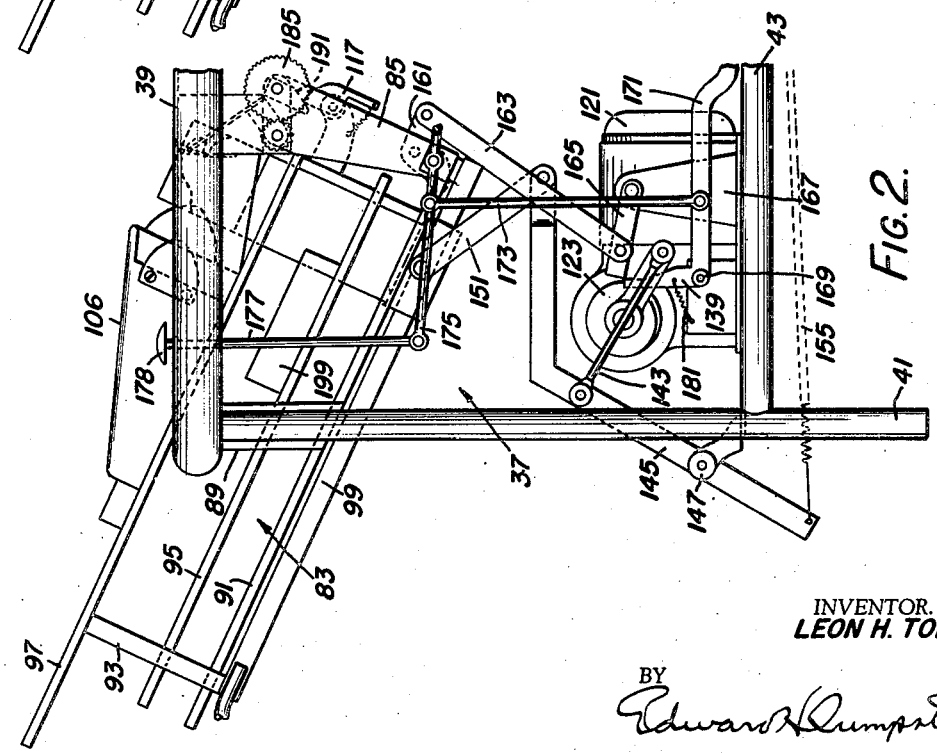
INVENTOR.
LEON H. TOBEY
BY
*Edward H. Dumpston*
HIS ATTORNEY Feb. 18, 1958   L. H. TOBEY   2,823,501
MACHINE FOR FILLING AND CLOSING CARTONS
Filed June 21, 1956   8 Sheets-Sheet 3

INVENTOR.
LEON H. TOBEY
BY
*Edward H. Cumpston*
HIS ATTORNEY

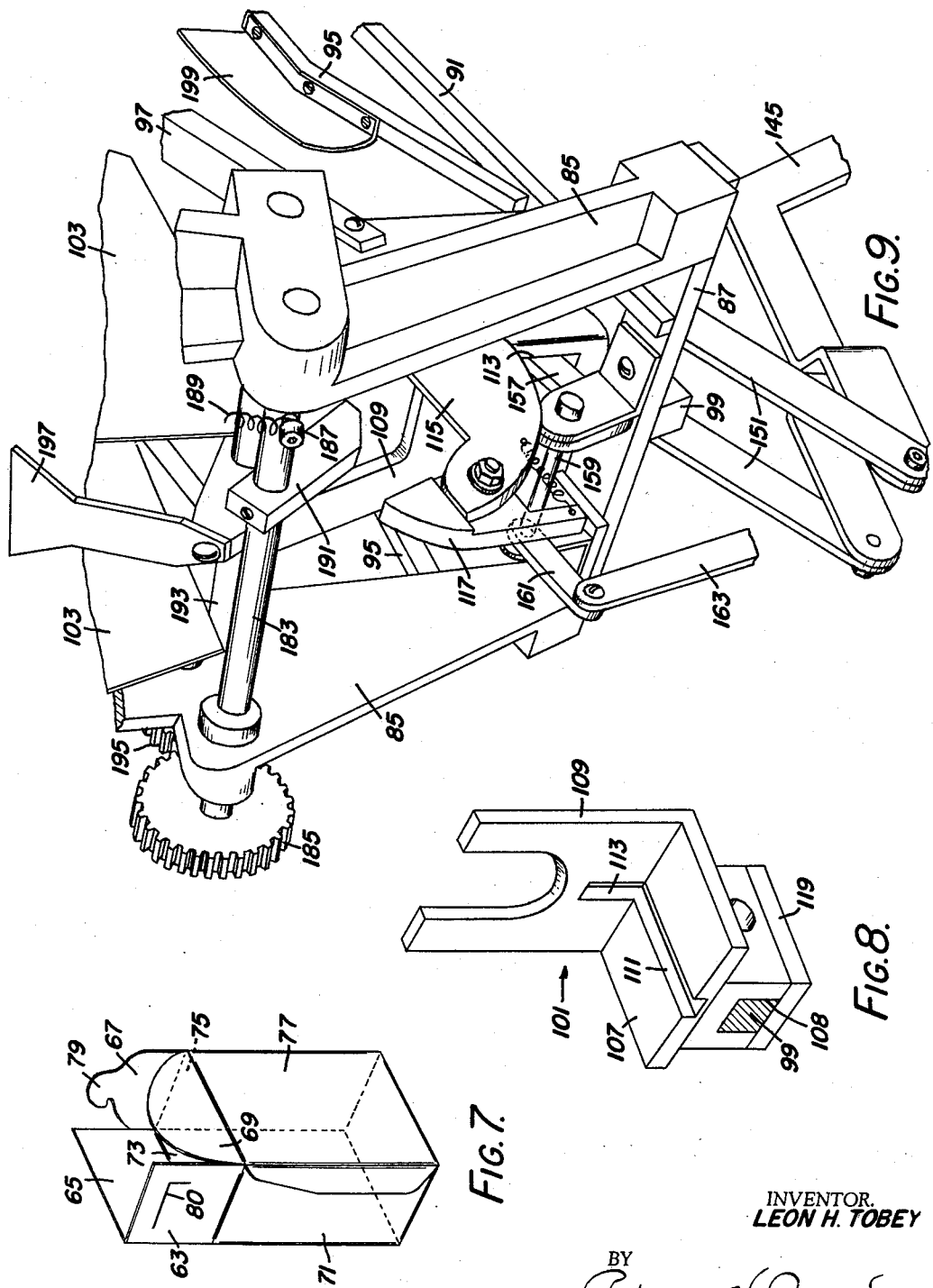

Feb. 18, 1958 L. H. TOBEY 2,823,501
MACHINE FOR FILLING AND CLOSING CARTONS
Filed June 21, 1956 8 Sheets-Sheet 5
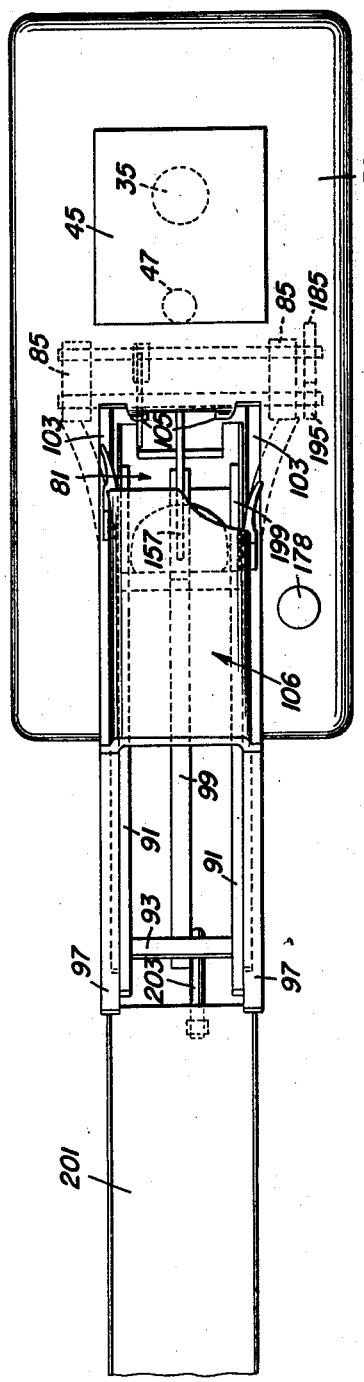
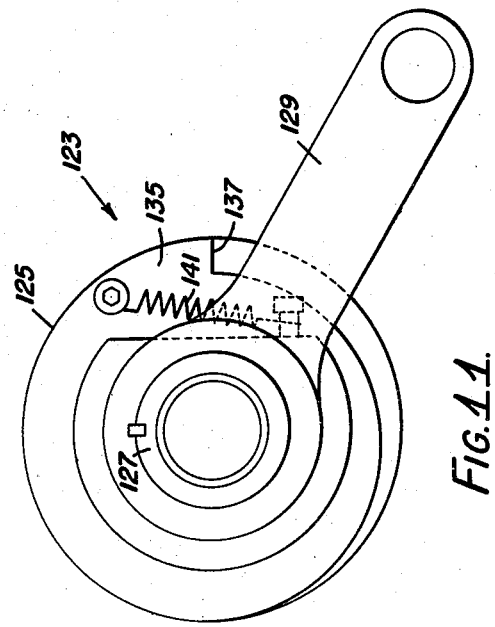
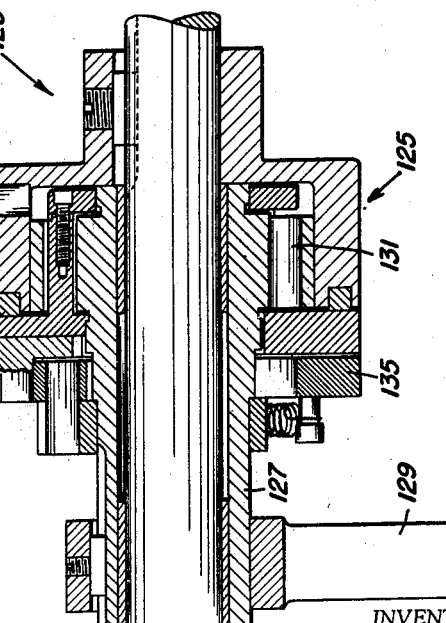
INVENTOR.
LEON H. TOBEY
BY
HIS ATTORNEY

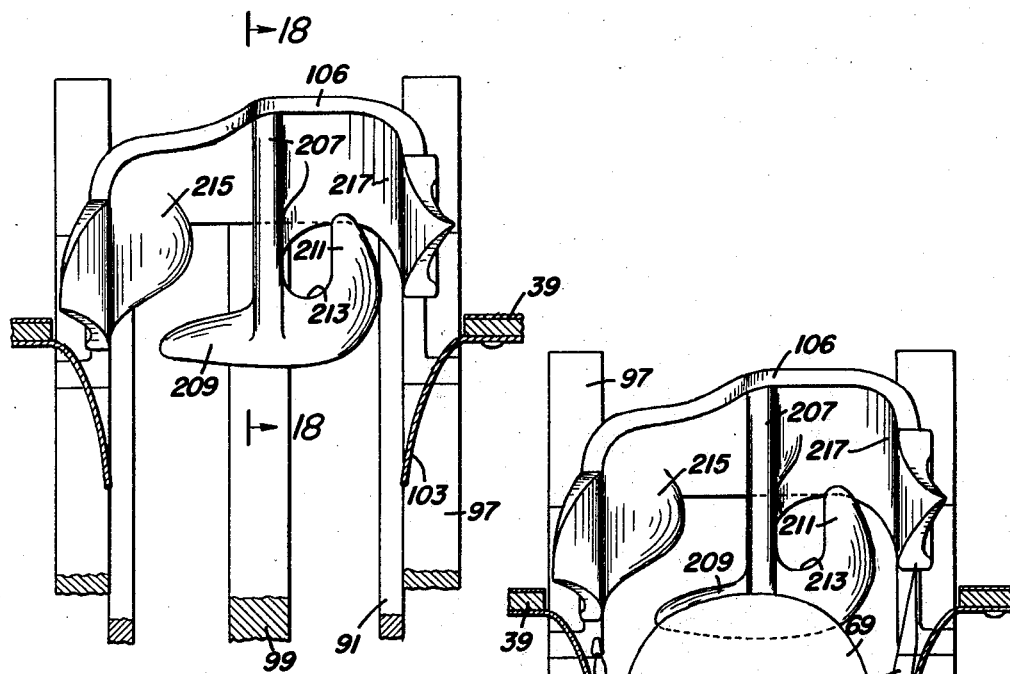
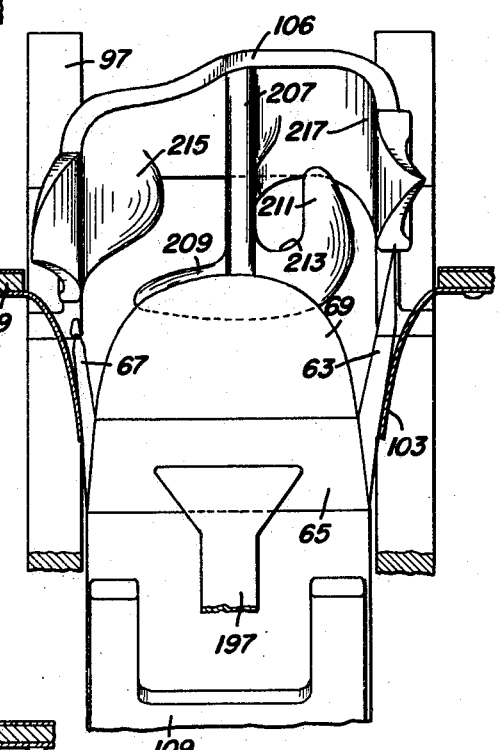
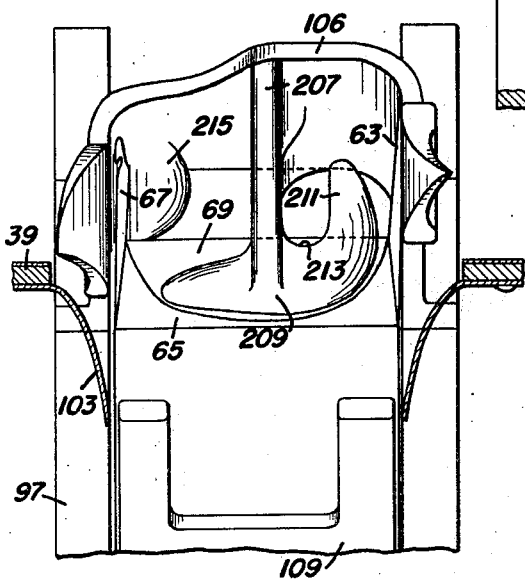

Feb. 18, 1958   L. H. TOBEY   2,823,501
MACHINE FOR FILLING AND CLOSING CARTONS
Filed June 21, 1956   8 Sheets-Sheet 8
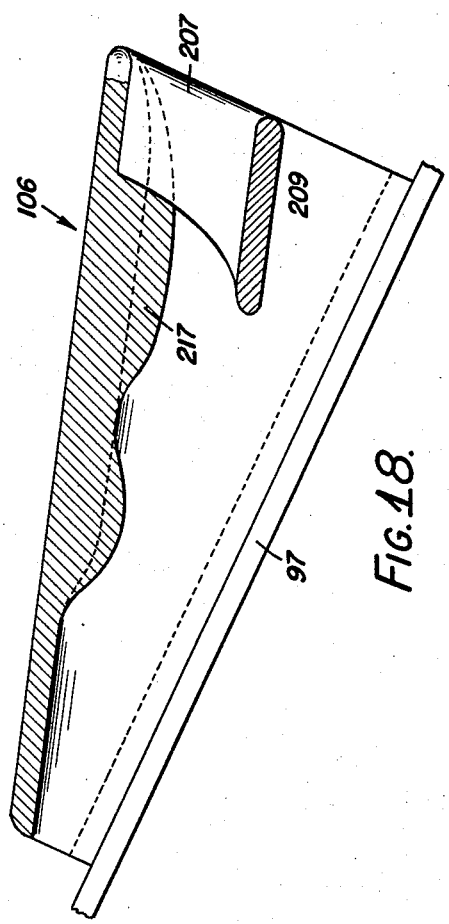
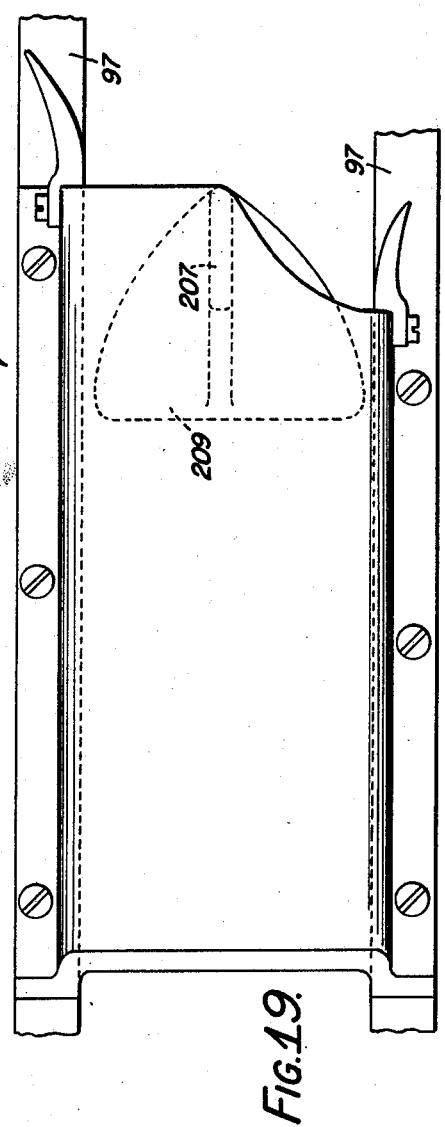
INVENTOR.
LEON H. TOBEY
BY
HIS ATTORNEY United States Patent Office 2,823,501
Patented Feb. 18, 1958

2,823,501

MACHINE FOR FILLING AND CLOSING CARTONS

Leon H. Tobey, Newark, N. Y., assignor to Bloomer Bros. Company, Newark, N. Y., a corporation of New York Application June 21, 1956, Serial No. 592,802

4 Claims. (Cl. 53—76)

This invention relates generally to machines for the packaging of fluent materials delivered at a substantially continuous rate and more specifically to a novel and improved machine for handling and packaging material of the foregoing type such as semi-liquid ice cream discharged in a steady stream from one or more so called continuous freezers, one object being to provide an improved machine of this character having a more simple and practical type of construction and capable of operation in a more reliable and efficient manner.

Another object of the invention is to provide a semi-automatic machine of the above type whereby a single operator can quickly and easily fill and close a large number of containers.

Another object is to provide a machine of the above nature which is so constructed that the filled cartons may be readily and conveniently moved into position in a flap closing mechanism for the subsequent closing of the flaps and delivery of the closed carton for further packaging or storing.

Another object is to provide a machine having the above advantages which is so constructed that once the filled carton has been placed in the flap closing mechanism, the operator merely needs to initiate the operation of the closing device which will thereafter complete the closing of the carton and deliver the closed carton, without further attention from the operator who may therefore devote the major portion of his time to the filling operation and in certain instances to the erection of the cartons prior to filling.

Another object of the invention is to provide a machine of the above character which is compact in size, contains few parts and which is capable of rapid and efficient operation.

A further object of the invention is to provide a machine of the above character which has few moving parts and has a more practical and efficient type of construction capable of being readily manufactured and assembled and capable of operating in an accurate and reliable manner.

To these and other ends the invention resides in certain improvements and combinations of parts, all as will be hereinafter more fully described, the novel features being pointed out in the claims at the end of the specification.

In the drawings:

Fig. 2 is a fragmentary side elevational view showing the flap folding mechanism in its initial position for receiving a carton;

Fig. 3 is similar to Fig. 2, but with a carton partially advanced through the flap closing mechanism;

Fig. 6 is a top plan view of the machine as shown in Fig. 1;

Fig. 7 is a top perspective view of a carton of the type adapted to be filled and closed by the above machine;

Fig. 8 is an enlarged perspective view of the pusher member which moves the carton through the second part of the flap closing mechanism;

Fig. 9 is an enlarged perspective view showing the mechanism for closing the first flap of the carton;

Fig. 10 is a sectional view of a single revolution clutch used to drive the flap closing mechanism;

Fig. 11 is an end elevation of the clutch shown just after the release;

Fig. 12 is a sectional view of the flap closing tunnel taken substantially along the line 12—12 in Fig. 1;

Figs. 13–17 are similar to Fig. 12 and show the carton in various positions in the flap closing tunnel;

Fig. 18 is a sectional elevation of the closing tunnel taken substantially along the line 18—18 in Fig. 12, and Fig. 19 is a top plan view of the erecting tunnel shown in Figs. 12–18.

Figure 1:
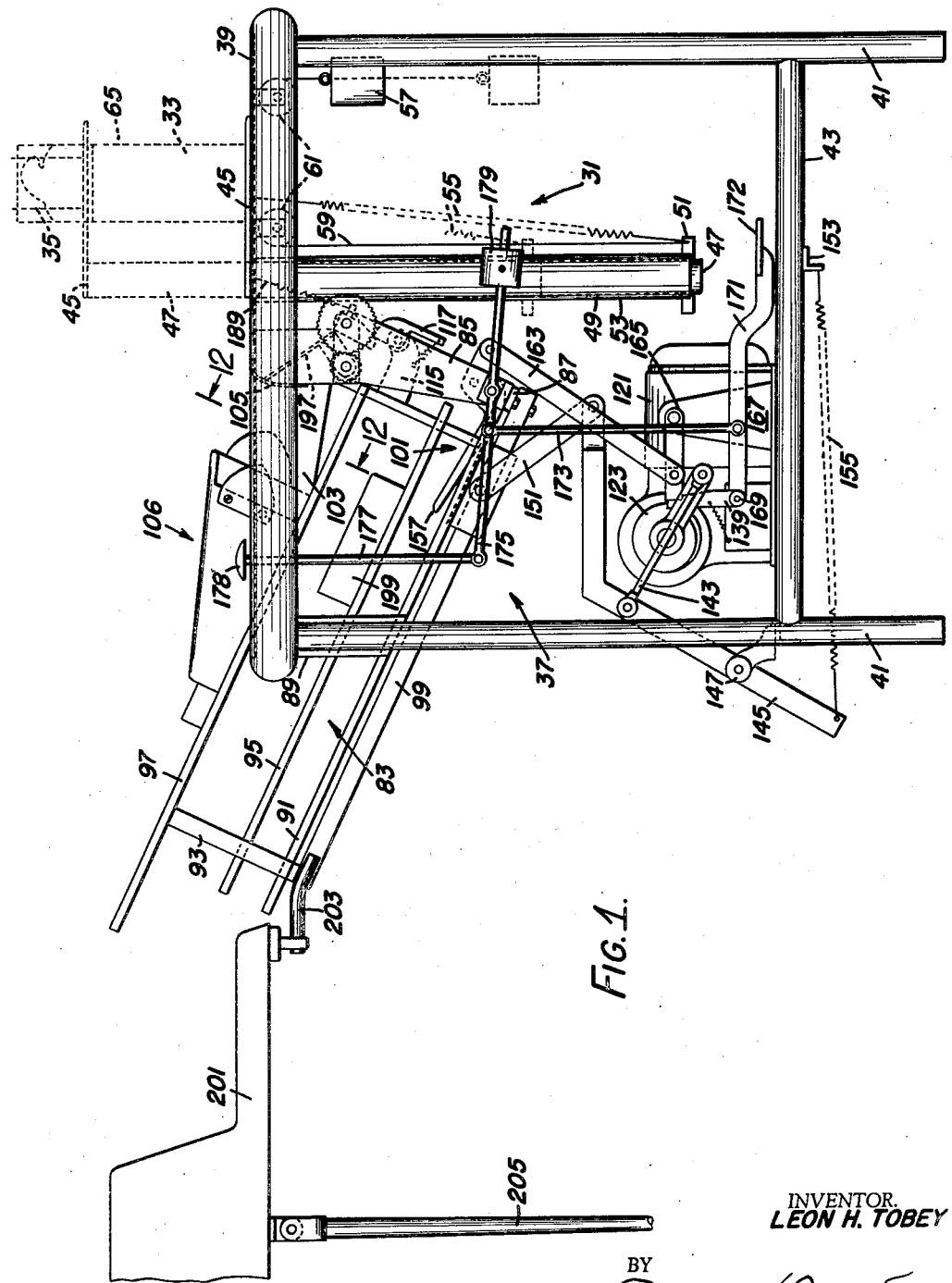
Fig. 1 is a side elevational view of a filling and closing machine embodying the present invention.

The preferred embodiment of the present invention, herein disclosed by way of illustration, comprises an elevating table mechanism shown generally at 31 (Fig. 1), for positioning a carton 33 beneath a filling spout or nozzle 35, and a mechanism for subsequently closing the top flaps of the previously filled carton, this latter mechanism being referred to as the flap closing mechanism and shown generally at 37 in Fig. 1. The above mechanisms are located on a unitary table or platform comprising a top member 39 mounted on four depending legs 41. A shelf or platform 43 is fastened to legs 41 below top member 39, as shown in Fig. 1, for supporting certain elements of the flap closing mechanism, as hereafter described.

Elevating table 31 preferably comprises a substantially flat plate or member 45 which is mounted on the upper end of a rod or tubular member 47 which in turn is mounted for vertical movement in a hollow guide member 49, as shown in Fig. 1. Member 47 has a pin or rod 51 extending transversely therethrough adjacent its lower end. Guide member 49 is formed with a pair of opposed longitudinally extending slots 53 (Fig. 1) through which pin 51 extends on opposite sides of the guide member. The ends of slots 53 limit the upward and downward movement of member 47 and consequently that of table member 45. Table 45 is urged upwardly to its position shown by dotted lines in Fig. 1 by the action of a coil spring 55 and a counterweight 57. Spring 55 is fastened at its upper end to the underside of table member 39 and its lower end to rod 51. Counterweight 57 is connected to the end of rod 51 by means of a suitable cable 59 which passes over stationary or idler pulleys 61, as shown in Fig. 1.

The present machine is designed for use with cartons having at least three top closure flaps for closing the top end of the carton. For purposes of illustration, I have shown a carton having top closure flaps, as above, in combination with an automatic bottom construction, such as that disclosed in the patent to Inman and Holmes, No. 2,655,304. In this type of carton the top closure comprises four flaps 63, 65, 67 and 69 which are foldably connected with the front, intermediate, rear and side walls 71, 73, 75 and 77, respectively. Opposed flaps 65 and 69 are designated as inner flaps and fold toward each other prior to the folding of the remaining flaps which are designated as outer flaps and fold at substantially right angles to the lines of fold of the inner flaps. One of the inner flaps, as for example flap 65, is preferably substantially the same size as the upper end of the carton and is designed to be closed first for substantially closing the entire end of the carton. Thereafter the smaller inner flap 69 which may be rectangular, trapezoidal or hemispherical is folded over flap 65. The outer flaps are then folded over the inner flaps. Outer flap 67 is provided with a locking tongue 79 which is adapted to engage the margins of a locking slot 80 in opposite outer flap 63 for holding the top flaps in closed position. The engagement of tongue 79 and slot 81 completes the folding and locking of the top flaps.

The operation of the elevating table is as follows: The table is depressed by hand to its lower position, as shown by the solid lines in Fig. 1 at which point an empty carton 33 having its top flaps folded back relative to the respective side walls, is placed on the table in position beneath filling nozzle 35. The table is then released and pushes the carton up over the nozzle. Thereafter, the flow of liquid material through nozzle 35 is started and as the material passes through the nozzle into the carton, the weight of the material in the carton plus the pressure of the material coming out through the nozzle gradually forces the carton and elevating table member downwardly as the carton is filled. This action eliminates voids in the material in the carton and at the same time increases the overall density of the material as it is forced out under pressure into the carton. When the carton is substantially full, it has forced elevating table 45 downwardly so that the top of the carton is substantially below the lower edge or lip of the filling nozzle. When the carton is filled to the desired point, the operator takes another carton and places it beneath the filling spout while at the same time removing the filled carton. The filled carton is then placed in the flap closing mechanism, as hereafter described, while the subsequent carton is moved upwardly over the filling spout by the action of elevating table 45, in the same manner as described above. Since the operator may actuate the flap closing mechanism by a single short operation, as by depressing a suitable foot or hand release, the operator's attention need not be removed from the filling operation. The flap closing mechanism operates in a semi-automatic fashion with no further attention from the operator to close the flaps on the carton and deliver the closed carton to a suitable area for storage or further packaging.

The flap closing mechanism comprises an inclined chute or passageway shown generally at 81 (Fig. 6) which extends from table member 39 downwardly to a second chute or passageway shown generally at 83 (Fig. 1), which extends at an angle to the first passageway. The upper end of passageway 81 is preferably located adjacent the left edge of elevating table 45 so that the operator may remove a filled carton from the elevating table and in a single operation place the filled carton in passageway 81 for subsequent closing of the top flaps. As stated, passageways 81 and 83 intersect beneath top member 39, and are preferably formed as follows:

Table member 39 has a pair of depending arms 85 (Figs. 2 and 9) fastened along opposite sides. Arms 85 are joined at their lower ends by a cross member 87 (Fig. 9). A second pair of depending arms 89 are attached to table member 39 adjacent the left end thereof, as shown in Fig. 1. Arms 85 and 89 support a series of elongated members or bars which are inclined upwardly to the left, as viewed in Figs. 1–4, and which form the sides and bottom of passageways 81 and 83.

Figure 5:
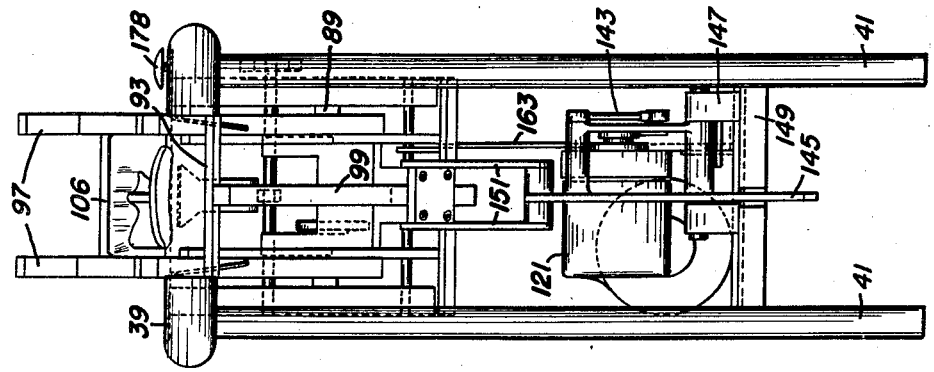
Fig. 5 is an end elevation of the machine as shown in Fig. 2 with the carton removed for purposes of clarity.

Passageways 81 and 83 are preferably formed with open sides and bottoms, although solid members could likewise be used. A pair of elongated members or bars 91 (Figs. 5 and 9) are preferably fastened at one end to cross arm 87 and extend upwardly to the left, as viewed in Fig. 1, and are fastened adjacent their left ends to a U-shaped supporting member 93 (Figs. 1 and 6). Bars 91 are positioned to support the bottom of the carton adjacent the opposite edges thereof. Spaced upwardly from members 91 is a pair of side wall members or rods 95 which extend upwardly to the left in much the same manner as members 91. A second set of side wall members 97 are positioned above members 95 and are substantially parallel therewith. Side wall members 95 and 97 are secured by suitable means such as bolts to depending arms 85 and 89 and to U-shaped member 93. A guide rod 99 (Figs. 1 and 6) is positioned beneath bottom bars 91 and is fastened at opposite ends thereof to member 93 and cross arm 87. Rod 99 serves as a guide for an L-shaped pusher member shown generally at 101 (Fig. 8) which moves the carton through passageway 83, as hereafter more fully described.

Side rods 95 and 97 and bottom rods 91 at their lower right hand ends, as viewed in Fig. 1, form part of first passageway 81. The upper portion of passageway 81 is formed by a pair of guide flanges or plates 103 (Figs. 5 and 9) which extend downwardly from top table 39. Flanges 103 are on opposite sides of the opening in table top 39 and are inclined slightly toward one another to provide sufficient frictional resistance for the movement of the filled carton through passageway 81 to eliminate any damage to the carton or displacement of the contents of the carton when the carton comes to rest against pusher shoe 101. The right hand edge of opening 81 is provided with a pair of smaller, spaced depending fingers or members 105 (Fig. 6) which help in guiding the carton through passageway 81.

Thus, when a filled carton is placed on the upper end of passageway 81, it moves by gravity through the passageway until the bottom comes to rest on pusher member 101 between guide rods 91. Opposite flaps 63 and 67 are moved to positions approximately parallel to their respective side walls by the action of fixed flange members 103 while larger rectangular inner flap 65 is moved to partially closed position partially overlying the open end of the carton by fingers 105. The remaining inner flap is also moved to position approximately parallel with the closure wall of the carton by engagement with the leading edge of a tunnel member which is shown generally at 106 (Fig. 1). The carton is thereafter moved through passageway 83 by the action of pusher 101 and the top flaps moved to their closed positions and interlocked by tunnel member 106, as hereafter more fully described.

Pusher member 101 is substantially L-shaped and comprises a base or bottom member 107 (Fig. 8) which is channeled out as at 108 (Fig. 8) to receive guide rod 99, and an upright or back member 109 (Fig. 8) which extends upwardly towards the upper end of passageway 81 and serves to form part of the side wall of the passageway when the pusher is in its normal retracted position shown in Figs. 1 and 6. Pusher bottom 107 has a longitudinally extending channel 111 (Fig. 1) formed therein and back 109 has an opening 113 formed therein which is in alignment with channel 111 for receiving the end of a safety latch mechanism, hereafter described. A flange or ear member 115 (Fig. 9) is fastened to the rear of pusher back 109 by bolts or other means, and has pivotally mounted at the outer end thereof a spring loaded pawl 117 which, as hereafter described, actuates mechanism for folding the larger rectangular inner bottom flap down across the open end of the carton. Pusher 101 is provided with a bottom plate 119 (Fig. 8) which closes the open end of channel 108 and holds the pusher on guide rod 99.

The mechanism for moving pusher 101 preferably comprises a gear head motor 121 (Fig. 2) mounted on platform 43, which in turn drives a one revolution clutch 123 (Figs. 2 and 3). Clutch 123 preferably is a single revolution clutch of known construction such as that manufactured by the Hilliard Corporation. As shown in Fig.

10, clutch 123 comprises generally an outer driving sleeve or shell 125 and an inner driven hub 127 which carries the tripping mechanism and to which a driven lever 129 is attached. A series of rollers 131 is held in position between members 125 and 127 by a cage 133. The rollers furnish the driving contact between outer sleeve 125 and inner hub 127. Rollers 131 are moved into and out of driving contact by the action of cage 133 which is controlled by a trip cam 135. Cam 135 is formed with a step or stop 137 (Fig. 11) which is engaged by a trip or release lever 139 (Figs. 2 and 3).

Figure 4:
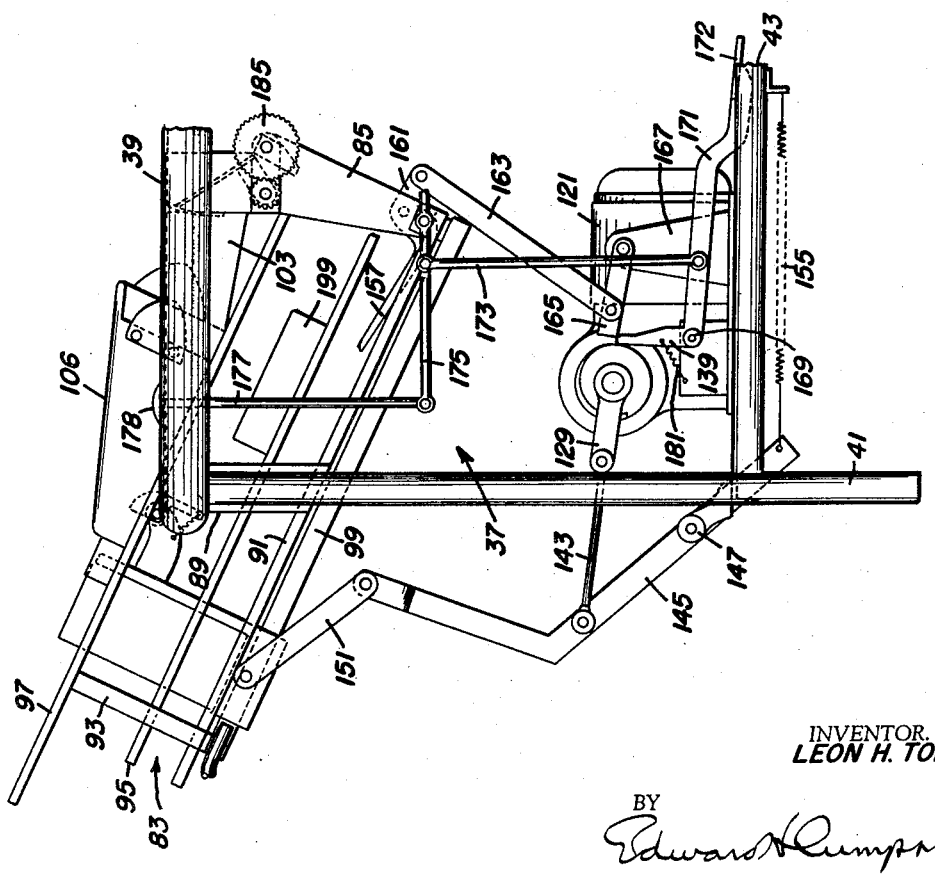
Fig. 4 is similar to Fig. 3, but with the carton adjacent the end of the closing mechanism.

In operation, power is supplied to the right end of outer sleeve 125 from motor 121. This outer member rotates continuously when motor 121 is running. Starting with the clutch in released position, with trip lever 139 in contact with cam stop 137, cage 135 is held in its counterclockwise position, as viewed in Fig. 11, against the action of a spring 141 (Fig. 11). In this position, cage 135 holds rollers 131 out of driving contact, and the clutch remains in the above released position so long as trip lever 139 is in contact with stop 137. When lever 139 is moved to the right, from its position shown in Fig. 2 to its position shown in Fig. 3, cam 135 is released and spring 141 snaps the cam into driving position and rollers 131 cause outer sleeve 125 to drive inner hub member 127. As can be seen in Figs. 3 and 4, lever 139 rides against the periphery of cam 135 and is in position to reengage stop 137 when driven member 127 has been carried through a complete revolution, at which point the clutch is released, as described above.

The rotation of arm 129 is transmitted to the remaining elements of the mechanism for moving pusher 101 through an adjustable connecting rod 143 (Fig. 2) which is connected at one end to arm 129 and at the other end to a pivoted actuating arm 145 (Figs. 25). Actuating arm 145 is pivoted on suitable bearings 147 (Fig. 5) which in turn are mounted on a cross member 149 (Fig. 5) between legs 41 of the table adjacent the left end of platform 43, as shown. The upper right hand end of actuating arm 145 is bifurcated as shown in Fig. 9 and has pivotally attached thereto a pair of short links 151 which in turn are pivotally connected at their opposite ends to the opposite sides of pusher 101 below bottom plate 107. Actuating arm 145 extends below bearings 147 and is connected to a suitable cross member 153 (Fig. 1) on platform 43 by a spring 155 which urges arm 145 in a counterclockwise direction as viewed in Figs. 14. Spring 155 supplements the action of motor 121 in moving arm 145 in a counterclockwise direction and helps overcome the initial inertia of the mechanism.

The mechanism for releasing clutch 123 and initiating the movement of pusher 101 to the left, as viewed in Figs. 2 and 3, comprises a safety lever 157 (Figs. 4 and 6) which is pivotally mounted on a short shaft 159 (Fig. 9) on cross arm 87. Lever 157 is elongated and extends through slot 113 in the back of the pusher and overlies open channel 111 in the bottom of the pusher. Shaft 159 has a short arm 161 (Figs. 4 and 9) fixed thereto. Arm 161 is pivotally connected to a link 163 (Fig. 9) which at its lower end is connected to a safety locking member 165 (Fig. 2). Member 165 is pivotally mounted at one end on an upstanding bracket 167 and at the other end rests against release member 139 and holds the same in position for arresting the rotary movement of clutch 123 and thus preventing movement of the arm 129 and pusher 101.

Release lever 139 is in turn pivotally mounted at 169 (Fig. 4) and has a fixed arm 171 connected thereto. An elongated connecting rod 173 (Fig. 3) is pivotally connected at its lower end to arm 171 and at its upper end to an intermediate lever 175. The intermediate lever is pivoted adjacent its middle point, and at one end is connected to a suitable trigger or release rod 177, which extends up through table top 39 where it is provided with a button 178 (Fig. 3) adjacent the upper end of passageway 81 for easy actuation by the operator. A counterweight 179 on the right end of intermediate rod 175 and a spring 181 connected at one end to lever 139 and at the other end to a fixed supporting member on platform 43 counterbalance the weight of the trigger mechanism and provide for smooth and easy operation. Release lever arm 171 may be extended to the right for forming a foot actuated release 172 as shown in Figs. 1, 3 and 4.

However, it will be seen that trip lever 139 cannot be released from its locked position shown in Fig. 2 for moving the carton beneath tunnel 106 unless safety lever 157 is first depressed as by the weight of a carton resting on the lever and on pusher shoe 101. Thus, safety lever 157 and associated members provide positive means for preventing the operation of pusher 101 unless a carton is in proper position to be moved under tunnel 106. This prevents pusher 101 from being moved under such circumstances as might cause injury to the operator, for when a carton is in proper position on the pusher, it not only depresses safety lever 157, but it also substantially fills passageway and prevents the operator from inadvertently placing his hand between the pusher and tunnel 106.

As stated, pusher 101 is provided with pawl 117 for driving the mechanism for closing large inner flap 65. As shown in Fig. 9, this mechanism comprises a transversely extending rod or shaft 183 which is mounted in suitable bearings on arms 85, as shown in Fig. 9. Shaft 183 is provided at the left end thereof with a gear 185 (Fig. 9) and at the right end thereof with a set screw 187 to which is attached one end of a coil spring 189, the other end of the spring being attached to the under surface of top member 39. A short lever 191 is fixed to shaft 183 for rotation therewith and is positioned to be engaged by pawl 117 as pusher 101 moves up passageway 83. A second shaft 193 is mounted on arms 85, parallel with shaft 183, and is provided adjacent its left end with a gear 195 which is engaged by gear 185 on shaft 183. Gear 195 is preferably ½ the diameter of gear 185 so that shaft 193 will turn at twice the speed of shaft 183. Shaft 193 has an L-shaped arm or lever 197 fixed thereto adjacent the middle of the shaft. The free end of lever 197 is preferably enlarged for engagement with flap 65, as hereafter described.

When pusher 101 is in its fully retracted position, as shown in Figs. 1 and 9, shaft 183 is held in its fully counterclockwise position, as viewed in Fig. 9, by the action of spring 189. In this position of the parts, lever 191 is in depending position in line with pawl 117 while lever 197 on shaft 193 is in its raised position. It will be seen that when pusher 101 moves upwardly along passageway 83 to the right in Fig. 9, pawl 117 will strike against the lower end of lever 191 moving the latter in a counterclockwise direction. This counterclockwise rotation of shaft 183 is transmitted by gears 185 and 195 to shaft 193 which is caused to rotate in a clockwise direction thereby swinging lever 197 downwardly in a clockwise direction and folding flap 65 over an open end of the carton. Since gear 185 is twice the diameter of gear 195, lever 197 moves at twice the speed of lever 191 and pusher 101, and therefore, accelerates flap 65 into fully closed position during the initial movement of the carton through passageway 83 and prior to the closing of any of the remaining top flaps.

As the carton moves up through passageway 83, the opposite sides of the carton are engaged by a pair of guide plates 199 (Figs. 1 and 9) which are attached to lower side rods 95 on opposite sides of the passageway. Guide plates 199 preferably frictionally engage the opposite sides of the carton adjacent the lower end thereof, and hold the carton firmly against the lower end of pusher back 109 as the carton starts through passageway 83 for the closing of the remaining flaps. Concomitantly with the engagement of the opposite sides of the carton, by guide plates 199, upper flaps 67, 69 and 63 start to enter within erecting tunnel 106. The under portion of tunnel 106 is formed with an appropriate contour to define a plurality of stationary longitudinal guiding elements which first close flap 69 and then gradually arch outer flaps 67 and 63 inwardly towards each other while opening locking slot 81 in flap 63 and guiding tongue 79 on flap 67 into the slot for locking the top flaps in closed position. After the carton has completed its passage through tunnel 106, all of the top flaps are securely closed and the carton is then in position for further packaging or storage. As each succeeding carton is moved through passageway 83 under tunnel 106, it forces the earlier erected cartons out through the open end of passageway on to a suitable loading table 201 (Fig. 1) which as shown in the present instance, is mounted adjacent the upper end of passageway 83. Table 201 is secured at one end to a pair of short rods 203 (Fig. 1) on member 93 and is provided mid-way therealong with a single adjustable leg 205.

Figure 15:
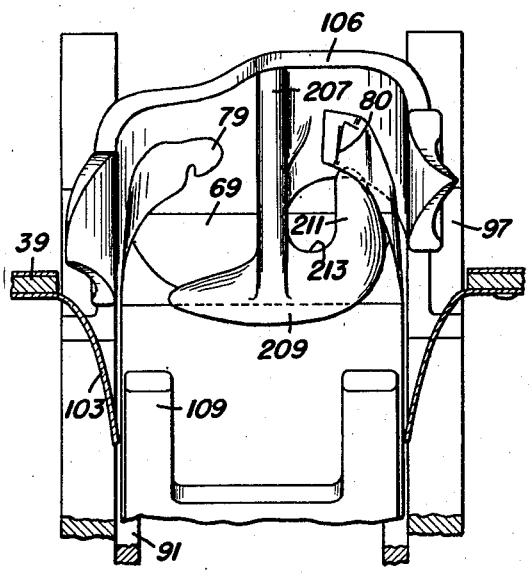
Figure 16:
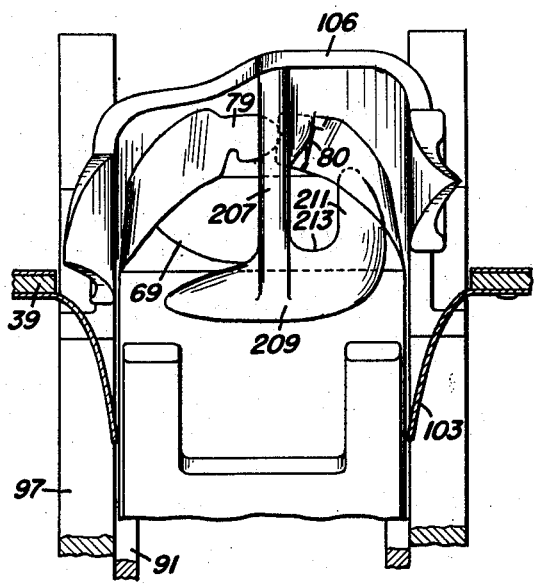

Tunnel 106 preferably is provided adjacent the entrance or right hand end thereof, with a depending member 207 which terminates in a horizontally extending member 209 having a substantially flat shape to the left of vertical member 207 and a raised portion 211 to the right of member 207. Raised portion 211 is spaced from center member 207 by a cut away portion 213. Members 207 and 209 engage inner flap 69 as the carton first enters the tunnel and fold the flap down over flap 65. The under surface at the top of tunnel 106 is formed with depending cam members 215 and 217 (Figs. 12 and 14) which are contoured to cooperate with horizontal member 209 and raised portion 211 to bend outer flaps 63 and 67 inwardly towards each other and into interlocked engagement as shown in progression in Figs. 15–17, thereby completing the folding of the flaps and closure of the top end of the carton.

Figure 17:
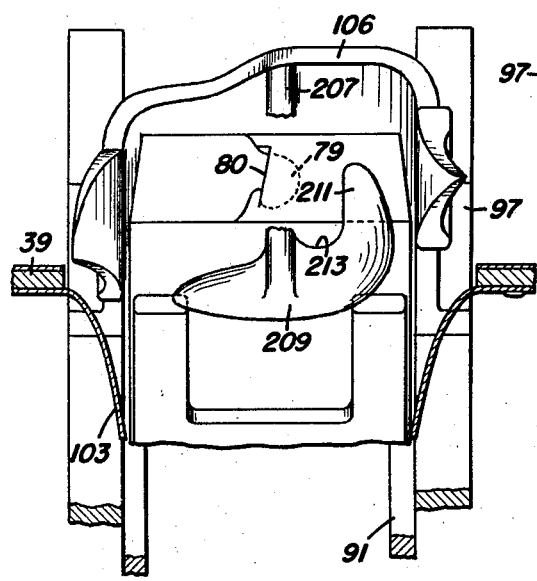

It will be seen that as the free edges of flaps 63 and 67 strike against cams 217 and 215, respectively, the flaps are gradually arched over toward each other. The end portion of flap 63 is bent downwardly towards the carton by cam 217 while the middle of the flap is held up by raised portion 211 of member 209. As a result, the end of flap 63 is forced downwardly partially into recessed portion 213 of member 209 (Fig. 16) thereby opening slot 81 so that tongue 79 may thereafter be guided into the slot by cam 215, as shown in Fig. 17.

*Synopsis of operation*

It is contemplated that my machine will be placed in operation in conjunction with a filling spout or nozzle connected to a continuous freezer for supplying a fluent mixture of ice cream. A single operator may operate the machine to fill the cartons on the elevating table, as described earlier, and to thereafter close the top flaps of the carton. The operator may be provided with a supply of erected cartons, or if the cartons are of the type having an automatic bottom construction as disclosed in the above patent to Inman and Holmes, the operator may quickly and easily snap the cartons to erected position by hand prior to filling, without decreasing his output of filled and closed cartons. As a filled carton is removed from the elevating table, the operator merely drops the carton into the open end of passageway 81. The carton passes through the passageway and comes to rest with its bottom resting on the bottom plate 107 of pusher 101. Opposed guide plates 103 swing outer flaps 63 and 67 to positions substantially parallel with the respective side walls of the carton while depending fingers 105 swing inner flap 65 slightly forwardly partially closing the open end of the carton. The carton has sufficient weight that it depresses safety release lever 157 and comes firmly to rest on pusher 101. Thereafter, the operator merely has to depress hand release button 178 or foot lever 172 either of which serves to retract trip lever 139 from engagement with trip cam step 137, thereby allowing clutch 123 to rotate once in a clockwise direction. As clutch 123 engages, driven member 127 and actuating arm 129 make a full revolution during which time the carton top flaps are moved to their fully erected position.

During the initial movement of the carton along passageway 83, inner flap 65 is folded down by the operation of pivoted finger 197 which has a greater linear speed than that of the carton. Thereafter, the opposite inner flap 69 is engaged by the leading edge of depending members 207 and 209 and is folded downwardly over flap 65. As the carton moves through tunnel 106 outer flaps 63 and 67 are bent inwardly towards each other and tongue 79 on flap 67 is guided into slot 81 on flap 63 thereby locking the top flaps in closed position. The filled and closed carton is then discharged from the left end of tunnel 106 and may be readily removed for further packaging or storage.

Thus it will be seen that my invention accomplishes its objects and produces a highly efficient and practical machine for filling packages with fluent material and for subsequently closing the open end of the packages. In addition, while the flap closing mechanism has been shown in conjunction with an elevating table, it will be understood that the closing mechanism may be used for closing cartons of the above type regardless how the cartons are filled and, thus, the flap closing mechanism may be used independently of the elevating table mechanism.

The flap closing mechanism comprises a few parts and has basically only two operating mechanisms, one being the pusher mechanism which moves the carton through the second passageway, the other being the mechanism for swinging lever 197 downwardly to move flap 65 to fully closed position. The flaps are swung from whatever position they may be in after filling to positions substantially parallel with the respective side walls by the movement of the carton through passageway 81. This movement is brought about by the action of gravity and does not involve any moving parts. Thereafter, with the exception of lever 197, the remaining flaps are closed by stationary guide or cam members which fold the flaps to their closed positions as the carton moved through passageway 83 beneath tunnel member 106.

Thus, it will be seen that my invention provides a machine which has a simple and practical construction and which will operate efficiently for long periods of time with minimum maintenance and repair. Since the majority of the elements of my machine are stationary, there is little opportunity for the machine to get out of adjustment or out of timing and there is little wearing of the elements of the machine.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A machine for filling and closing the end of a carton having at least three end flaps, said flaps comprising a pair of opposed outer flaps foldable toward each other along substantially parallel lines and an inner flap foldable at substantially right angles to the fold lines of said outer flaps, interlocking means on said outer flaps adapted to be engaged for holding said flaps in closed position, said machine comprising movable platform means for supporting the carton in position for filling beneath a nozzle, yieldable means urging said platform and carton upwardly toward said nozzle, a chute through which said filled carton moves, means adjacent said chute for folding said outer flaps to positions substantially in alignment with the side walls of the carton during said movement of the carton, a second chute through which said carton is moved, means for moving said carton through said second chute, means adjacent said second chute moving faster than said carton for folding said inner flaps down across the open end of the carton, means engaging the outer surfaces of said outer pair of flaps for folding the same downwardly as said carton moves through said second chute, means cooperating with said last mentioned means for engaging the under surface of one of said outer flaps for guiding said locking means into interengagement for completing the closure of said end of said carton, and motor actuated means for driving said carton moving means and said means for folding said inner flap.

2. A machine for closing the end of a carton having at least three end flaps, said flaps comprising a pair of opposed outer flaps foldable toward each other along substantially parallel lines and an inner flap foldable at substantially right angles to the fold lines of said outer flaps, interlocking means on said outer flaps adapted to be engaged for holding said flaps in closed position, said machine comprising a chute through which said carton first moves, means adjacent said chute for folding said outer flaps to positions substantially in alignment with the side walls of the carton during said movement of the carton, a second chute through which said carton is moved, means for moving said carton through said second chute, means adjacent said second chute moving faster than said carton for folding said inner flap down across the open end of the carton, means engaging the outer surfaces of said outer pair of flaps for folding the same downwardly as said carton moves through said second chute, means cooperating with said last mentioned means for engaging the under surface of one of said outer flaps for guiding said locking means into interengagement for completing the closure of said end of said carton, and motor actuated means for driving said carton moving means and said means for folding said inner flap.

3. A machine for closing the end of a carton having at least three end flaps, said flaps comprising a pair of opposed outer flaps foldable toward each other along substantially parallel lines and an inner flap foldable at substantially right angles to the fold lines of said outer flaps, interlocking means on said outer flaps adapted to be engaged for holding said flaps in closed position, said machine comprising a chute through which said carton first moves, means adjacent said chute for folding said outer flaps to positions substantially in alignment with the side walls of the carton during said movement of the carton, a second chute through which said carton is moved, pusher means for moving said carton through said second chute, means for driving said pusher means, motor means for actuating said driving means, means intermittently connected said motor means to said driving means, means actuated by said operator for operating said connecting means, means preventing the operation of said connecting means except when said carton is in position for movement through said second chute, means adjacent said second chute moving faster than said carton for folding said inner flap down across the open end of the carton, means engaging the outer surfaces of said outer pair of flaps for folding the same downwardly as said carton moves through said second chute, means cooperating with said last mentioned means for engaging the under surface of one of said outer flaps for guiding said locking means into interengagement for completing the closure of said end of said carton.

4. A machine for closing the end of a carton having at least three end flaps, said flaps comprising a pair of opposed outer flaps foldable toward each other along substantially parallel lines and an inner flap foldable at substantially right angles to the fold lines of said outer flaps, interlocking means on said outer flaps adapted to be engaged for holding said flaps in closed position, said machine comprising a chute through which said carton first moves, means adjacent said chute for folding said outer flaps to positions substantially in alignment with the side walls of the carton during said movement of the carton, a second chute through which said carton is moved, pusher means for moving said carton through said second chute, driving means for actuating said pusher means, motor means for actuating said driving means, means intermittently connecting said motor means to said driving means, means actuated by said operator for operating said connecting means, lever means extending into the path of movement of said carton through said first chute and movable from a first position to a second position by the movement of said carton to the end of said first chute, said lever means in said first position engaging said operating means for preventing actuation of said operating means, said lever in said second position being out of engagement with said operating means for releasing the same for actuation by the operator for operating said connecting means, said end flaps being closed and locked by the movement of said carton through said second chute.

No references cited.